United States Patent Office

3,342,866
Patented Sept. 19, 1967

3,342,866
METHOD FOR PREPARING 1,2,3-TRIS-(DIFLUOROAMINO)PROPANE
Anthony J. Passannante, Metuchen, and Leland K. Beach, Westfield, N.J., assignors to Esso Research and Engineering Company, a corporation of Delaware
No Drawing. Filed Jan. 27, 1960, Ser. No. 932
4 Claims. (Cl. 260—583)

The present invention relates to the preparation of 1,2,3-tris (difluoroamino) propane. Specifically, the present invention concerns the preparation of the aforementioned propane compound from allyl difluoroamine and tetrafluorohydrazine.

It is known that organic compounds having a high $NF_2/C$ ratio make excellent oxidizers for rocket propellants. Some of these compounds possess the characteristics of both oxidizers and fuels and thus may be employed as monopropellants. Considerable difficulty has been encountered in preparing organic compounds containing more than two $NF_2$ groups. For example in some earlier work it was noted that when butadiene-1,3 or cyclopentadiene was reacted with tetrafluorohydrazine, a compound containing two $NF_2$ groups was obtained. It was concluded from this work that the presence of an $NF_2$ group on a carbon adjacent to a double bond prevented the addition of tetrafluorohydrazine to that double bond.

It has now been surprisingly discovered that tetrafluorohydrazine will add to allyl difluoroamine under mild conditions to make 1,2,3-tris (difluoroamino) propane. Under optimum conditions the yield of propane compound, based on the allyl difluoroamine, is substantially quantitative. The product contains one difluoroamino group per carbon atom and thus is classified as a high energy compound.

The allyl difluoroamine employed in the process of the present invention may be obtained from any suitable source. It is readily prepared from allyl bromide and tetrafluorohydrazine. For example, about 2 to 5 moles of allyl bromide per mole of tetrafluorohydrazine may be reacted in the vapor phase at about 150 to 250° C. for about 1 to 5 minutes under pressures of 500 mm. to 5 atmospheres. The allyl difluoroamine produced is easily separated from the crude reaction mixture by distillation after venting any unreacted $N_2F_4$. The allyl difluoroamine boils at a temperature of about 3 to 42° C. under atmospheric pressure and may be collected in a condenser cooled with Dry Ice. The allyl difluoroamine recovered in this manner is about 98% pure and is highly suitable for use in the preparation of the propane compound. Of course, less pure allyl difluoroamine, e.g. 95%, may be employed as long as the impurities in the reactant do not significantly interfere with the formation of the propane compound.

The tetrafluorohydrazine, which is a gas at ambient temperature and atmospheric pressure, should also be essentially free of substances which adversely affect the reaction. In order to obtain optimum yields of the propane compound, the tetrafluorohydrazine should have a purity of at least 98 or 99%.

In carrying out the process of the present invention, allyl difluoroamine is reacted with tetrafluorohydrazine at temperatures of 0 to 300° C. and under pressures ranging from 10 or 20 mm. to 30 atmospheres or more in a suitable vessel or tube. It has been noted that the reaction is quite smooth and the yields are substantially quantitative when the process is carried out in the gas or vapor phase at 100 to 200° C. under pressures of 20 mm. to about 2 atmospheres. The mole ratio of tetrafluorohydrazine to allyl difluoroamine should be about 1 to 10:1, and is preferably 1 to 2:1.

The reaction time is dependent upon the temperature, pressure and ratio of the reactants. In general, it may range from a few minutes to several days. When the reaction temperature is between 100 and 200° C. and the pressure is substantially atmospheric, the reaction time will be about 1 to 24 hours where the mole ratio of the reactants is 1:1. By employing larger amounts of tetrafluorohydrazine and higher temperatures, the reaction time may be reduced to 1 or 2 minutes. Moreover, if the conversion level is adjusted to about 20 or 40% and the unreacted reactants are recycled to the reaction zone, the contact time may be less than 1 minute.

The conditions of the present invention may be varied to suit the particular needs of the operator. For instance the process may be run at room temperature or lower so that the allyl difluoroamine is a liquid instead of a vapor. In such a case it is advisable to use superatmospheric pressure in order to increase the solubility of the tetrafluorohydrazine in the liquid and thereby increase the reaction rate. Also, while inert diluents or gases are not necessary for the process, they may be employed if their use is considered to be beneficial. For instance, inert gases such as nitrogen or helium may be utilized to increase the pressure in the reaction zone.

Since the yield of 1,2,3-tris (difluoroamino) propane is substantially quantitative under certain of the aforementioned conditions, there is no separation problem when such conditions are employed. However, if the process is operated using excess tetrafluorohydrazine, the propane compound may be easily separated from the unreacted tetrafluorohydrazine by collecting the propane compound in an ice trap and recovering the uncondensed tetrafluorohydrazine in a liquid nitrogen trap. The unreacted tetrafluorohydrazine may be recycled to the reaction zone after being heated to the proper temperature. Because the propane compound is somewhat unstable and shock-sensitive, it is advisable to carry out the process in such a manner that very little or no unreacted allyl difluoroamine is present in the product stream. If the propane compound is contaminated with an undesirably large amount of allyl difluoroamine it may be reacted with additional tetrafluorohydrazine to convert the allyl difluoroamine to the propane compound or the allyl difluoroamine may be separated from the propane compound by fractional distillation. By adjusting the conditions so that all of the allyl difluoroamine reacts with the tetrafluorohydrazine the relatively hazardous distillation step can be avoided.

The 1,2,3-tris (difluoroamino) propane compound is particularly suitable as an oxidizing agent for boron fuels. A suitable rocket propellant composition utilizing this oxidizing agent is as follows:

TABLE I

| Component: | Weight percent |
|---|---|
| 1,2,3-tris (difluoroamino) propane | 48.0 |
| Tetranitromethane | 39.4 |
| Boron | 2.6 |
| Rubber binder | 10.0 |

This propellant composition has a calculated specific impulse of 282 sec.$^{-1}$.

The 1,2,3-tris (difluoroamino) propane is useful not only as an oxidizer in rocket propellants but may also be employed to prepare nitriles, amines and other nitrogen-containing compounds of known utility. Moreover, since it is explosive it can be used as a detonator or explosive. It may also be pyrolyzed in the presence or absence of boron to make carbon black, boron trifluoride and other useful chemicals.

The process of the present invention will be better understood by referring to the following specific examples:

EXAMPLE 1

Allyldifluoroamine ($1.08 \times 10^{-2}$ mole) and tetrafluorohydrazine ($1.35 \times 10^{-2}$ mole) are introduced into a one liter glass reaction bulb provided with a thermowell to accommodate a thermocouple. An initial pressure of 450 mm. of mercury at 25° C. is attained. The temperature is raised to 170° C. and maintained at 170° C. for 16 hours. After this interval the reaction mixture is allowed to cool to room temperature. The product is separated from excess tetrafluorohydrazine by fractional condensation in a vacuum train using Dry Ice and liquid nitrogen traps. The liquid nitrogen cooled trap contains tetrafluorohydrazine and the Dry Ice cooled trap contains the product, 1,2,3-tris (difluoroamino) propane (95% yield).

EXAMPLE 2

Allyldifluoroamine ($1.08 \times 10^{-2}$ mole) and tetrafluorohydrazine ($5.4 \times 10^{-2}$ mole) are introduced into a 15 ml. pressure reactor by means of a vacuum train and liquid nitrogen bath. The temperature is raised to 85° C. and maintained at this temperature for three hours. After cooling to ambient temperature and separation of product in the conventional manner on a vacuum train, a 99+% yield of 1,2,3-tris (difluoroamino) propane is obtained.

The allyl difluoroamine employed in the foregoing examples is prepared as follows:

Allyl bromide and tetrafluorohydrazine in a 5:1 molar ratio (bromide to hydrazine compound) are introduced into a hot tube reactor made of 15 feet of ¼ inch stainless steel tubing. The reactor is maintained at 200° C. and the flow rate of reactants is controlled to give a residence time of about 30 seconds. The effluent material is caught in a Dry Ice cooled trap and consists of 33 mole percent allyldifluoroamine, 16 mole percent 1,2,3-tribromopropane, 36 mole percent allyl bromide and several other minor constituents. The allyl difluoroamine is isolated by distillation. The distilled product is fractionated and the material boiling at 42° C. is collected.

It is not intended to restrict the present invention to the foregoing examples which are merely given to demonstrate the invention. It should only be limited to the appended claims in which it is intended to claim all of the novelty inherent in the invention as well as the modifications and equivalents coming within the scope and spirit of the invention.

What is claimed is:

1. Process for making 1,2,3-tris (difluoroamino) propane which comprises reacting allyl difluoroamine with tetrafluorohydrazine at temperatures of 0 to 300° C. under pressures of 10 mm. to 30 atmospheres for a sufficient time to make said propane compound.

2. Process for making 1,2,3-tris (difluoroamino) propane which comprises reacting tetrafluorohydrazine with allyl difluoroamine by contacting about 1 to 10 moles of tetrafluorohydrazine in a reaction mixture with 1 mole of allyl difluoroamine in the vapor phase under pressures of 20 mm. to 2 atmospheres at a reaction temperature in the range of about 100° C. to 200° C. for from a few seconds to several days to form said 1,2,3-tris (difluoroamino) propane.

3. Process for making 1,2,3-tris (difluoroamino) propane which comprises reacting tetrafluorohydrazine with allyl difluoroamine in about a 1 to 2:1 mole ratio in the vapor phase at about 100 to 200° C. under pressures of 20 mm. to 2 atmospheres for from a few seconds to 24 hours and distilling the reaction mixture to recover said propane compound.

4. Process according to claim 3 in which the reaction time is 1 hour to 24 hours and the yield of propane compound is substantially quantitative.

No references cited.

CHARLES B. PARKER, *Primary Examiner.*

R. L. CAMPBELL, L. D. ROSDOL, *Examiners.*

J. W. HISLER, *Assistant Examiner.*